(12) United States Patent
Sakashita (10) Patent No.: US 11,996,509 B2
(45) Date of Patent: May 28, 2024

(54) BATTERY INCLUDING ELECTRODE COLLECTOR LAMINATED PARTS DIVIDED INTO GROUPS SHIFTED TO NOT OVERLAP AND JOINED TO SINGLE COLLECTOR TERMINAL

(71) Applicant: Prime Planet Energy & Solutions, Inc., Tokyo (JP)

(72) Inventor: Yasuhiro Sakashita, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 149 days.

(21) Appl. No.: 17/406,968

(22) Filed: Aug. 19, 2021

(65) Prior Publication Data

US 2022/0077488 A1  Mar. 10, 2022

(30) Foreign Application Priority Data

Sep. 8, 2020 (JP) .................................. 2020-150369

(51) Int. Cl.
*H01M 10/04* (2006.01)
*H01M 10/0525* (2010.01)

(52) U.S. Cl.
CPC ... *H01M 10/0418* (2013.01); *H01M 10/0431* (2013.01); *H01M 10/0525* (2013.01)

(58) Field of Classification Search
CPC ...................... H01M 10/0418; H01M 10/0431
USPC ........................................... 429/94, 161, 162
See application file for complete search history.

(56) References Cited

U.S. PATENT DOCUMENTS

| | | | |
|---|---|---|---|
| 2008/0060189 A1* | 3/2008 | Daidoji .............. | H01M 50/566 29/623.1 |
| 2009/0087737 A1* | 4/2009 | Yamauchi .......... | H01M 50/566 429/185 |
| 2011/0129707 A1* | 6/2011 | Ahn ..................... | H01M 10/02 429/94 |
| 2013/0143109 A1* | 6/2013 | Kim ..................... | H01M 50/54 429/178 |
| 2017/0309886 A1 | 10/2017 | Maeda et al. | |

(Continued)

FOREIGN PATENT DOCUMENTS

| | | |
|---|---|---|
| CN | 101140983 A | 3/2008 |
| CN | 107452935 A | 12/2017 |

(Continued)

*Primary Examiner* — Sean P Cullen
(74) *Attorney, Agent, or Firm* — HAUPTMAN HAM, LLP (57) ABSTRACT

A battery includes: an electrode body including a positive electrode having a positive electrode active material layer formed on a positive electrode collector and a negative electrode having a negative electrode active material layer formed on a negative electrode collector. At one end of the electrode body, a positive electrode collector laminated part, in which a positive electrode collector exposed part is stacked, is present. At another end thereof, a negative electrode collector laminated part, in which a negative electrode collector exposed part is stacked, is present. The positive electrode collector laminated part and the negative electrode collector laminated part are divided into groups while the groups being shifted in position so as not to overlap on a same line in the stacking direction in the electrode body. The groups are mutually independently integrated in one unit, and all tip parts of the groups are joined with one collector terminal.

4 Claims, 5 Drawing Sheets

(56) References Cited

U.S. PATENT DOCUMENTS

| | | | |
|---|---|---|---|
| 2018/0287210 A1* | 10/2018 | Matsuura | H01M 10/0585 |
| 2018/0375162 A1* | 12/2018 | Wakimoto | H01M 50/553 |
| 2019/0013507 A1 | 1/2019 | Shinyashiki et al. | |
| 2020/0251787 A1 | 8/2020 | Shinoda et al. | |

FOREIGN PATENT DOCUMENTS

| | | | | |
|---|---|---|---|---|
| CN | 107851770 A | 3/2018 | | |
| CN | 108695541 A | 10/2018 | | |
| JP | 2017-027837 A | 2/2017 | | |
| JP | 2017-79139 A | 4/2017 | | |
| JP | 2017-142896 A | 8/2017 | | |
| JP | 2017199652 A | 11/2017 | | |
| JP | 2018-125238 A | 8/2018 | | |
| JP | 2018-181510 A | 11/2018 | | |
| WO | WO-2018231605 A1 * | 12/2018 | | H01M 10/04 |
| WO | 2019088053 A1 | 5/2019 | | |

* cited by examiner

BATTERY INCLUDING ELECTRODE COLLECTOR LAMINATED PARTS DIVIDED INTO GROUPS SHIFTED TO NOT OVERLAP AND JOINED TO SINGLE COLLECTOR TERMINAL

BACKGROUND OF THE INVENTION

1. Field of the Invention

The present disclosure relates to a battery. The present application claims the priority based on Japanese Patent Application No. 2020-150369 filed on Sep. 8, 2020, the entire contents of which are incorporated in the present specification by reference.

2. Description of the Related Art

In recent years, a battery, particularly, a nonaqueous electrolyte secondary battery such as a lithium ion secondary battery has been suitably used for a portable power supply for, e.g., a personal computer, and a portable terminal, a vehicle driving power supply for, e.g., an electric vehicle (EV), a hybrid vehicle (HV) and a plug-in hybrid vehicle (PHV), or other uses.

Generally, a nonaqueous electrolyte secondary battery (particularly, a lithium ion secondary battery) has a configuration in which an electrode body formed by stacking a positive electrode and a negative electrode with a separator interposed therebetween is accommodated in a battery case. The electrode body is electrically connected to electrode external terminals provided at the battery case via electrode collector terminals. Conventionally, for the purpose of enhancing the space efficiency in a battery case, a study has been conducted on the structure of connection between the electrode body and the collector terminal. For example, Japanese Patent Application Publication No. 2017-79139 proposes that, for enhancing the space efficiency in the battery case, a collector tab that includes an electrode collector protruding in an oblique direction with respect to the thickness direction of the electrode body is formed, and that the collector tab and an electrode collector terminal inclined in an oblique direction are joined with each other.

SUMMARY OF THE INVENTION

However, the present inventors conducted study intensively, and consequently found the following: in the related art, a collecting collector is usually formed of aluminum foil or copper foil; for this reason, the collector tab is also formed of aluminum foil or copper foil; when the collector tab and the electrode collector terminal inclined in an oblique direction are joined with each other, the collector tab is required to be twisted; for this reason, the collector tab may be broken. Namely, the related art has room for improvement regarding the suppression of breakage of the electrode collector part serving as a collector part.

Under such circumstances, it is an object of the present disclosure to provide a battery that is capable of implementing a high space efficiency in the battery case and less susceptible to breakage at the electrode collector part serving as the collector part.

The battery herein disclosed includes: an electrode body including a sheet-shaped positive electrode having a positive electrode active material layer formed on a positive electrode collector, and a sheet-shaped negative electrode having a negative electrode active material layer formed on a negative electrode collector, the sheet-shaped positive electrode and sheet-shaped negative electrode being stacked one on another with a separator interposed therebetween; and a battery case accommodating the electrode body. At one end of the electrode body in a direction orthogonal to a direction of the stacking, a positive electrode collector laminated part, in which a positive electrode collector exposed part which does not have the positive electrode active material layer formed thereon is stacked in a state of protruding from the negative electrode, is present. In addition, at another end thereof, a negative electrode collector laminated part, in which a negative electrode collector exposed part which does not have the negative electrode active material layer formed thereon is stacked in a state of protruding from the positive electrode, is present. Herein, the positive electrode collector laminated part and the negative electrode collector laminated part are respectively divided into a plurality of groups while the groups being shifted in position so as not to overlap each other on a same line in the direction of the stacking in the electrode body. The plurality of divided groups are mutually independently integrated in one unit, respectively, and all tip parts of the groups are joined with one collector terminal. With such a configuration, a battery is provided which can attain a high space efficiency in the battery case, and is less susceptible to breakage at the electrode collector part serving as a collector part.

In accordance with one desirable aspect of the battery herein disclosed, the number of stacked layers of the electrode body is 90 or more. With such a configuration, the effects of the present disclosure are more increased.

In accordance with another desirable aspect of the battery herein disclosed, the electrode body is a wound electrode body. With such a configuration, the effects of the present disclosure are more increased.

DESCRIPTION OF THE PREFERRED EMBODIMENTS

Below, embodiments in accordance with the present disclosure will be described by reference to the accompanying drawings. It should be noted that matters which is not referred to in the present specification and is necessary to implement the present disclosure can be grasped as design matters of those skilled in the art based on the related art in the present field. The present disclosure can be implemented based on the contents disclosed in the present specification, and the technical common sense in the present field. Further, in the following drawings, the members/parts producing the same effect are given the same reference number and sign for description. Furthermore, the dimensional relation (such as length, width, or thickness) in each drawing does not reflect the actual dimensional relation.

Figure 1:
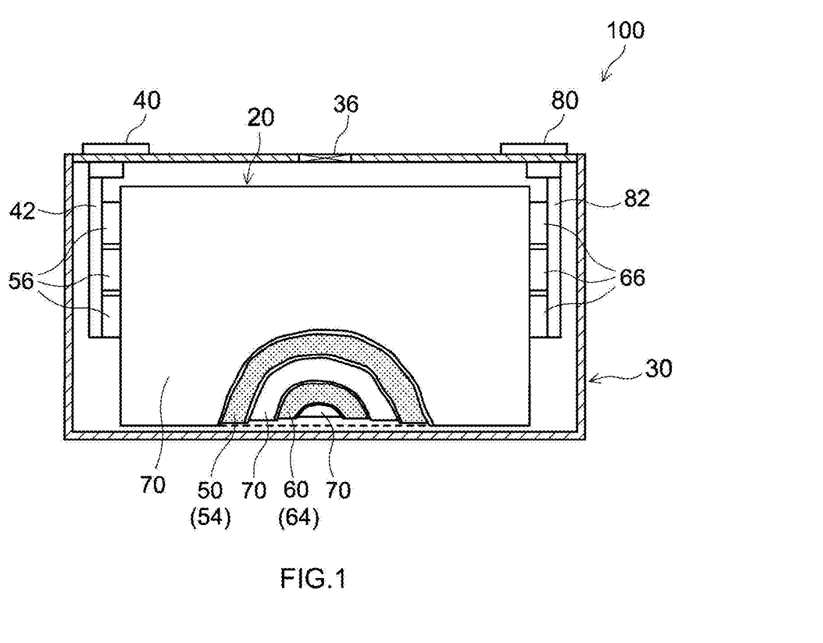
FIG. 1 is a cross sectional view schematically showing a configuration of a lithium ion secondary battery in accordance with one embodiment of the present disclosure.

FIG. 1 is a cross sectional view schematically showing the configuration of a lithium ion secondary battery 100 of one example of a battery in accordance with the present embodiment. It should be noted that in the present specification, a term "secondary battery" denotes an electric storage device capable of being repeatedly charged and discharged, and is a term encompassing a so-called storage battery, and an electric storage element such as an electric double layer capacitor. Further, in the present specification, the term "lithium ion secondary battery" denotes a secondary battery using lithium ions as electric charge carriers, and implementing charging and discharging by the transfer of electric charges accompanying lithium ions between the positive and negative electrodes.

The lithium ion secondary battery 100 shown in FIG. 1 is an example using a wound electrode body 20 as the electrode body. It should be noted that the electrode body of the lithium ion secondary battery 100 may be a stacked type electrode body including a plurality of positive electrode sheets and a plurality of negative electrode sheets stacked therein. The lithium ion secondary battery 100 is a sealed type battery constructed by accommodating the wound electrode body 20 having a flat shape and a nonaqueous electrolyte (not shown) in a flat rectangular battery case (i.e., an exterior container) 30. As the material for the battery case 30, for example, a metal material which is lightweight and has good thermal conductivity such as aluminum is used.

The battery case 30 is provided with a positive electrode terminal 40 for external connection, a negative electrode terminal 80 for external connection, and a thin-walled safety valve 36 that is set so as to release the internal pressure when the internal pressure of the battery case 30 increases to a prescribed level, or higher. The battery case 30 is provided with an injection port (not shown) for injecting a nonaqueous electrolyte. The positive electrode terminal 40 is electrically connected with a positive electrode collector terminal 42. The negative electrode terminal 80 is electrically connected with a negative electrode collector terminal 82.

The wound electrode body 20 has a form in which a long positive electrode sheet 50 and a long negative electrode sheet 60 are stacked one on another via two long separator sheets 70, and are wound in the longitudinal direction. Accordingly, when the wound electrode body 20 is seen from the thickness direction, a positive electrode layer formed of a part of the positive electrode sheet 50, and a negative electrode layer formed of a part of the negative electrode sheet 60 are alternately stacked one on another with separator layers each formed of a part of the separator 70 interposed therebetween. Accordingly, the thickness direction of the wound electrode body 20 conforms with the stacking direction of the wound electrode body 20.

The number of stacked layers of the wound electrode body 20 (i.e., the number of stacked layers of the positive electrode layers or the negative electrode layers of the wound electrode body) has no particular restriction. Generally, when the number of stacked layers of the electrode body increases, the battery can be increased in capacity. On the other hand, the space for collecting current becomes necessary, resulting in degradation of the space efficiency. Therefore, with an increase in the number of stacked layers of the wound electrode body 20, the capacity of the battery increases, and the space efficiency improving effects by the present disclosure increase. As a result of this, the number of stacked layers of the wound electrode body 20 is desirably 90 or more.

Figure 2:
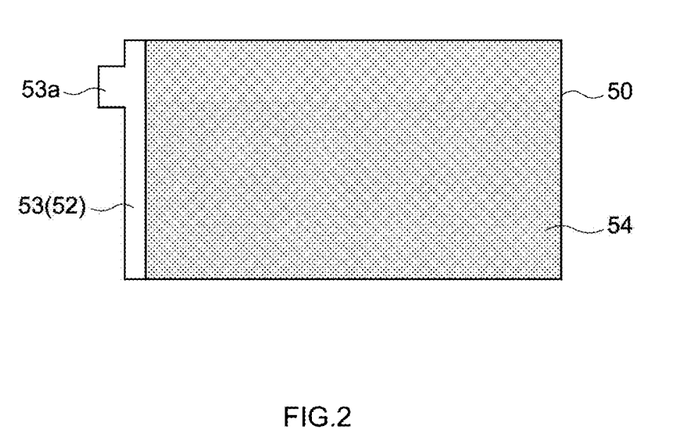
FIG. 2 is a schematic view of one of positive electrode layers formed by a positive electrode sheet included in an electrode body of the lithium ion secondary battery of FIG. 1.

FIG. 2 is a schematic view obtained by extracting one of the positive electrode layers formed by the positive electrode sheet 50 included in the wound electrode body 20. As shown, the positive electrode sheet 50 has a configuration in which a positive electrode active material layer 54 is formed on a long positive electrode collector 52. The positive electrode active material layer 54 is generally formed on each opposite surface of the positive electrode collector 52, and may be formed only on one surface.

Examples of the positive electrode collector 52 constituting the positive electrode sheet 50 may include aluminum foil. The thickness of the aluminum foil is, for example, 5 µm to 35 µm, and desirably 7 µm to 20 µm. The positive electrode active material layer 54 includes at least a positive electrode active material. Examples of the positive electrode active material may include lithium transition metal composite oxides such as lithium nickel cobalt manganese composite oxide (e.g., $LiNi_{1/3}Co_{1/3}Mn_{1/3}O_2$), lithium nickel composite oxide (e.g., $LiNiO_2$), lithium cobalt composite oxide (e.g., $LiCoO_2$), lithium nickel manganese composite oxide (e.g., $LiNi_{0.5}Mn_{1.5}O_4$). The positive electrode active material layer 54 may further include a conductive material, a binder, and the like. As the conductive materials, for example, carbon black such as acetylene black (AB), and other carbon materials (such as graphite) can be used. As the binder, for example, polyvinylidene fluoride (PVDF) can be used.

Figure 3:
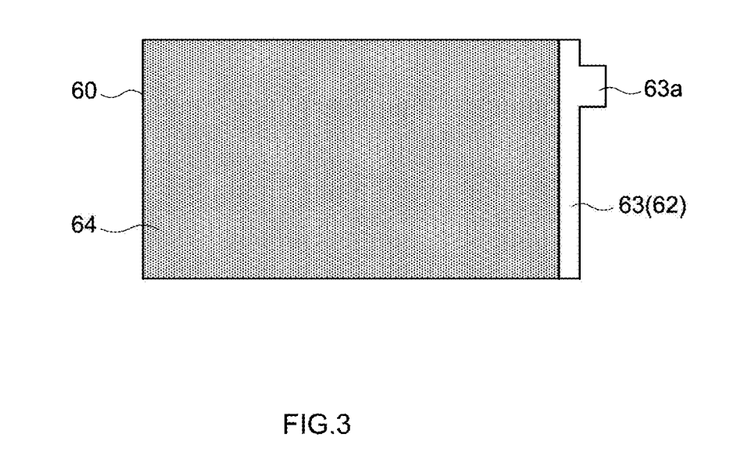
FIG. 3 is a schematic view of one of negative electrode layers formed by a negative electrode sheet included in the electrode body of the lithium ion secondary battery of FIG. 1.

FIG. 3 is a schematic view obtained by extracting one of the negative electrode layers formed by the negative electrode sheet 60 included in the wound electrode body 20. As shown, the negative electrode sheet 60 has a configuration in which a negative electrode active material layer 64 is formed on a negative electrode collector 62. The negative electrode active material layer 64 is generally formed on each opposite surfaces of the negative electrode collector 62, and may be formed on only one surface.

Examples of the negative electrode collector 62 constituting the negative electrode sheet 60 may include copper foil. The thickness of the copper foil is, for example, 5 µm to 35 µm, and desirably 7 µm to 20 µm. The negative electrode active material layer 64 includes a negative electrode active material. Examples of the negative electrode active material may include carbon materials such as graphite, hard carbon, and soft carbon. The negative electrode active material layer 64 may further include a binder, a thickener, and the like. As the binder, for example, styrene butadiene rubber (SBR) can be used. As the thickener, for example, carboxymethyl cellulose (CMC) can be used.

As shown in FIG. 2, the positive electrode sheet 50 has a positive electrode collector exposed part (i.e., the portion at which the positive electrode active material layer 54 is not formed and the positive electrode collector 52 is exposed) 53 at the end thereof. Further, in the positive electrode sheet 50, a positive electrode collector tab 53a including the protrusion in the width direction of a part of the positive electrode collector exposed part 53 is formed.

Similarly, as shown in FIG. 3, the negative electrode sheet 60 has a negative electrode collector exposed part (i.e., the portion at which the negative electrode active material layer 64 is not formed, and the negative electrode collector 62 is exposed) 63 at the end thereof. In the negative electrode sheet 60, a negative electrode collector tab 63a including the protrusion in the width direction of a part of the negative electrode collector exposed part 63.

Figure 4A:
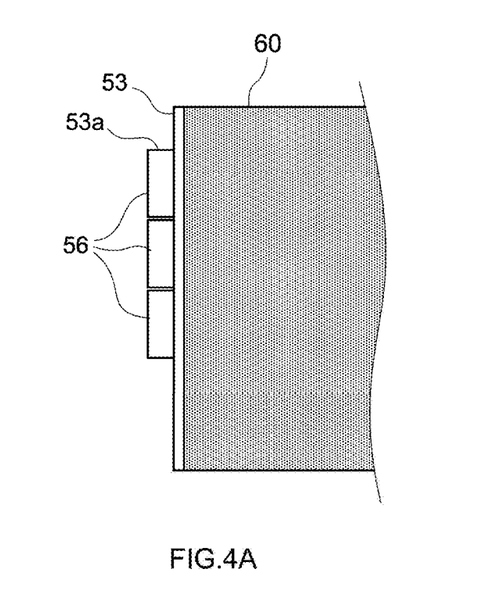
FIG. 4A is a front view schematically showing the end on the positive electrode side of the electrode body of the lithium ion secondary battery of FIG. 1.
Figure 4B:
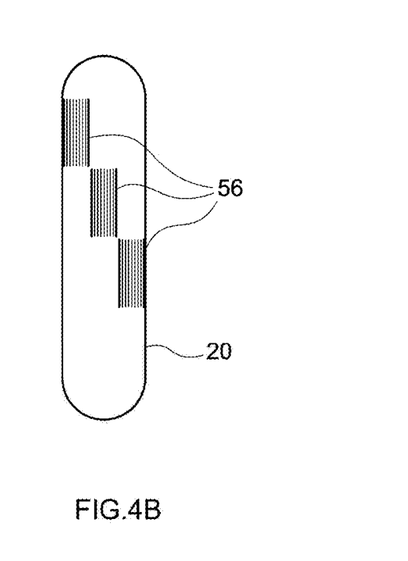
FIG. 4B is a side view schematically showing the end on the positive electrode side of the electrode body of the lithium ion secondary battery of FIG. 1.

FIGS. 4A and 4B are each a view schematically showing the end on the positive electrode side of the wound electrode body 20, where FIG. 4A is a front view, and FIG. 4B is a side view. In FIG. 4A, the negative electrode sheet 60 is situated on the positive electrode sheet 50. At the end on the positive electrode side in the direction orthogonal to the stacking direction of the wound electrode body 20, the positive electrode collector exposed parts 53 (particularly, the positive electrode collector tabs 53a) protrude from the end of the negative electrode sheet 60. The direction orthogonal to the stacking direction of the wound electrode body 20 is also the winding axis direction of the wound electrode body 20, and the width direction of the positive electrode sheet 50 and the negative electrode sheet 60. The protruding positive electrode collector exposed parts 53 (particularly, the positive electrode collector tabs 53a) are stacked. Accordingly, the wound electrode body 20 has a positive electrode collector laminated part 56 including the positive electrode collector exposed parts 53 stacked while protruding from the negative electrode sheet 60 at one end in the direction orthogonal to the stacking direction.

Similarly, as shown in FIG. 1, at the other end in the direction orthogonal to the stacking direction of the wound electrode body 20, the negative electrode collector exposed parts 63 (particularly, the negative electrode collector tabs 63a in FIG. 3) protrudes from the end of the positive electrode sheet 50. The protruding negative electrode collector exposed parts 63 (particularly, the negative electrode collector tabs 63a in FIG. 3) are stacked. Accordingly, the wound electrode body 20 has a negative electrode collector laminated part 66 including the negative electrode collector exposed parts 63 stacked while protruding from the positive electrode sheet 50 at one end in the direction orthogonal to the stacking direction.

As shown in FIGS. 4A and 4B, the positive electrode collector laminated part 56 is divided into a plurality of groups while the groups being shifted in position so as not to overlap each other on the same line in the stacking direction of the electrode body 20. In the example shown, as seen along the stacking direction of the wound electrode body 20, the positive electrode collector laminated part 56 is divided into 3 groups so that the resulting groups do not overlap each other. The groups are mutually independently integrated in one unit (i.e., subjected to foil collecting). In the example shown, the three groups of the positive electrode collector laminated part 56 are arranged in a stepwise shape. However, the arrangement of the plurality of groups of the positive electrode collector laminated part 56 is not limited to this unless the groups overlap each other on the same line in the stacking direction of the wound electrode body 20. The number of the positive electrode collectors 52 (particularly, the positive electrode collector tabs 53a) forming the groups of the positive electrode collector laminated part 56 has no particular restriction, and is desirably 15 or more and 30 or less.

As shown in FIG. 1, each tip part of all the groups of the positive electrode collector laminated part 56 is joined to one positive electrode collector terminal 42. Specifically, each tip part of all the groups of the positive electrode collector laminated part 56 is joined to one surface, perpendicular to the stacking direction of the wound electrode body 20, of the positive electrode collector terminal 42. The joining method has no particular restriction. These may be joined by ultrasonic welding, laser welding, or the like. Each tip part of the group of the positive electrode collector laminated part 56 may be bent for facilitating joining.

The negative electrode collector laminated part 66 is similarly configured as the positive electrode collector laminated part 56. Namely, the negative electrode collector laminated part 66 is divided into a plurality of groups while the groups being shifted in position so as not to overlap each other on the same line in the stacking direction of the wound electrode body 20. Specifically, as seen along the stacking direction of the wound electrode body 20, the negative electrode collector laminated part 66 is divided into three groups so that the groups do not overlap each other. The groups are mutually independently integrated in one unit (i.e., subjected to foil collecting). The number of the negative electrode collectors 62 (particularly, the negative electrode collector tabs 63a) forming the groups of the negative electrode collector laminated part 66 has no particular restriction, and is desirably 15 or more and 30 or less.

Whereas, each tip part of all the groups of the negative electrode collector laminated part 66 is joined to one negative electrode collector terminal 82. Specifically, each tip part of all the groups of the negative electrode collector laminated part 66 is joined to one surface, perpendicular to the stacking direction, of the wound electrode body 20 of one negative electrode collector terminal 82. Each tip part of the groups of the negative electrode collector laminated part 66 may be bent for facilitating joining.

For enabling a high space efficiency in the battery case, the following is required: each length in the width direction of the positive electrode collector exposed part 53 and the negative electrode collector exposed part 63 is shortened, and the distance between the end of the wound electrode body 20 and the positive electrode collector terminal 42, and the distance between the end of the wound electrode body 20 and the negative electrode collector terminal 82 are reduced. With the foregoing configuration, the positive electrode collector exposed part 53 and the negative electrode collector exposed part 63 are divided into a plurality of groups to be stacked. For this reason, each length in the width direction of the positive electrode collector exposed part 53 and the negative electrode collector exposed part 63 can be shortened. Particularly, even when the thickness of the wound electrode body 20 is increased, an increase in number of the groups can keep shortening of each length in the width direction of the positive electrode collector exposed part 53 and the negative electrode collector exposed part 63. Accordingly, with the foregoing configuration, even when the thickness and the number of stacked layers of the wound electrode body 20 are large, the high space efficiency in the battery case can be attained.

In addition, the positive electrode collector laminated part 56 and the negative electrode collector laminated part 66 are divided into a plurality of groups while the groups being shifted in position so as not to overlap each other on the same line, and are joined to one positive electrode collector terminal 42 and one negative electrode collector terminal 82, respectively. For this reason, the positive electrode collector 52 and the negative electrode collector 62 are not required to be twisted for joining. Accordingly, breakage by twisting thereof is less likely to be caused, and the joint structure itself is less likely to be broken.

As the separators 70, various porous sheets the same as or similar to those to be conventionally used for a lithium ion secondary battery can be used. Examples thereof may include a porous resin sheet formed of a resin such as polyethylene (PE) or polypropylene (PP). Such a porous resin sheet may be a monolayered structure, or may be a multiple layered structure of two or more layers (e.g., a three-layered structure including PP layers stacked on the opposite surfaces of a PE layer). The separator 70 may include a heat resistant layer (HRL).

As the nonaqueous electrolyte, the same ones as those for a conventional lithium ion secondary battery can be used, and typically, those containing a support salt in an organic solvent (nonaqueous solvent) can be used. As the nonaqueous solvents, aprotic solvents such as carbonates, esters, and ethers can be used. Out of these, carbonates are desirable. Examples of carbonates may include ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). Such nonaqueous solvents can be used singly or in appropriate combination of two or more thereof. As the support salts, for example, lithium salts such as $LiPF_6$, $LiBF_4$, and lithium bis(fluorosulfonyl)imide (LiFSI) can be desirably used. The concentration of the support salt is desirably 0.7 mol/L or more and 1.3 mol/L or less.

It should be noted that the nonaqueous electrolyte may include other components than the nonaqueous solvent and the support salt, for example, various additives such as a gas generator, a film forming agent, a dispersant, and a thickener unless they remarkably impair the effects of the present disclosure.

Then, an example of a method for manufacturing a lithium ion secondary battery 100 will be described. The method for manufacturing a lithium ion secondary battery 100 is not limited to the example described below.

At first, a step of manufacturing the wound electrode body 20 is performed. Specifically, first, a positive electrode sheet 50 including a positive electrode active material layer 54 provided on a positive electrode collector 52, a negative electrode sheet 60 including a negative electrode active material layer 64 provided on a negative electrode collector 62, and two separator sheets 70 are prepared. The positive electrode sheet 50 is provided with a positive electrode collector exposed part 53 which does not include a positive electrode active material layer 54 formed therein. A part of the positive electrode collector exposed part 53 is cut by laser or the like so as to create positive electrode collector tabs 53a at a prescribed interval. Similarly, the negative electrode sheet 60 is provided with a negative electrode collector exposed part 63 which does not include a negative electrode active material layer 64 formed therein. A part of the negative electrode collector exposed part 63 is cut by laser or the like so as to create negative electrode collector tabs 63a at a prescribed interval. The prescribed interval is the interval such that when the positive electrode collector tabs 53a and the negative electrode collector tab 63a are respectively stacked for manufacturing the wound electrode body 20 using the positive electrode sheet 50 and the negative electrode sheet 60, the laminated parts thereof are divided into a plurality of groups while the groups being shifted in position so as not to overlap each other on the same line. As for the others, in the same manner as the ordinary method, the positive electrode sheet 50, the negative electrode sheet 60, and the separator sheets 70 can be prepared.

Then, the positive electrode sheet 50, the negative electrode sheet 60, and two separator sheets 70 are stacked one on another, and these are wound by a known method (e.g., a method using a flat-shaped core member and a winding machine), resulting in the wound electrode body 20. At this step, stacking is performed so that the separator sheet 70 is interposed between the positive electrode sheet 50 and the negative electrode sheet 60. Further, stacking is performed so that the positive electrode collector tabs 53a and the negative electrode collector tabs 63a protrude in the opposite directions in the winding axis direction.

Alternatively, the following is also acceptable: a cylindrical wound body of the positive electrode sheet 50, the negative electrode sheet 60, and the separator sheets 70 is manufactured with a known method, and the wound body is placed sideways in a press, and is pressed to be flattened, resulting in the wound electrode body 20.

With the wound electrode body 20 obtained in this manner, a positive electrode collector laminated part 56 including the positive electrode collector exposed parts 53 stacked while protruding from the negative electrode sheet 60 is provided at one end in the direction orthogonal to the stacking direction of the wound electrode body 20, and a negative electrode collector laminated part 66 including the negative electrode collector exposed parts 63 stacked while protruding from the positive electrode sheet 50 is present at the other end. Then, the positive electrode collector laminated part 56 and the negative electrode collector laminated part 66 are divided into a plurality of groups while the groups being shifted in position so as not to overlap on the same line in the stacking direction of the wound electrode body 20, respectively.

Figure 5A:
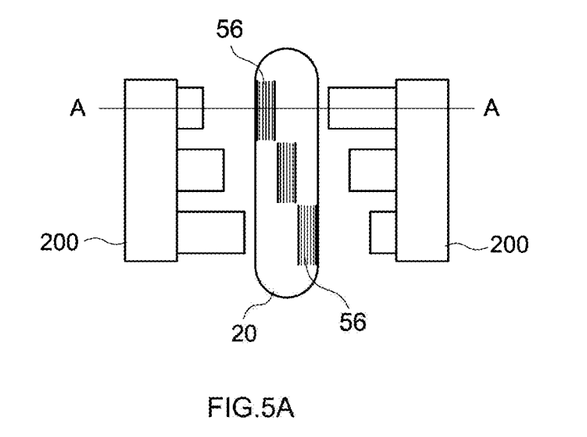
FIG. 5A is an explanatory view of the foil collecting operation (before foil collecting) when the electrode body is seen from the side surface.
Figure 5B:
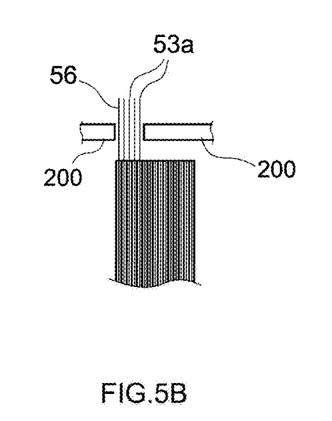
FIG. 5B is a schematic cross sectional view along line AA of FIG. 5A.
Figure 6A:
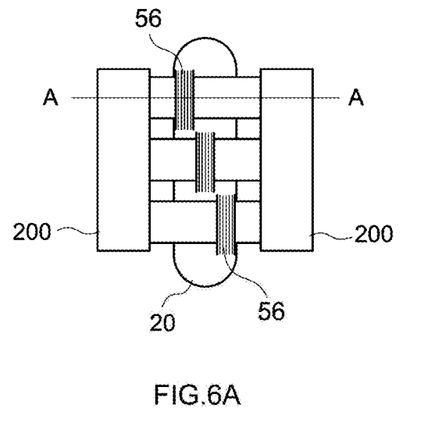
FIG. 6A is an explanatory view of the foil collecting operation (after foil collecting) when the electrode body is seen from the side surface.
Figure 6B:
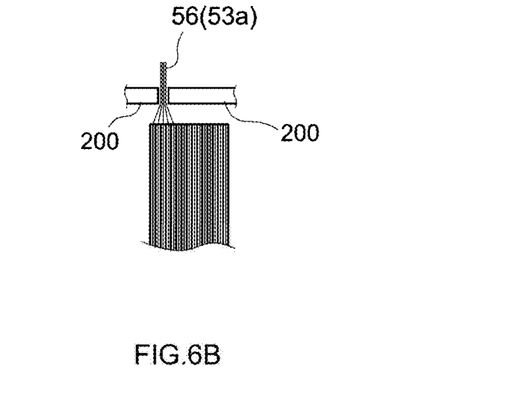
FIG. 6B is a schematic cross sectional view along line AA of FIG. 6A.

Subsequently, an electrode terminal attaching step is performed. FIGS. 5A to 9 each schematically show the contents of procedures for attaching the electrode terminal on the positive electrode side. The wound electrode body 20 is held so that the winding axis direction becomes the vertical direction. As shown in FIGS. 5A, 5B, 6A and 6B, each divided group of the positive electrode collector laminated part 56 is sandwiched using a pair of foil collecting jigs 200, and foil collecting is performed so as to eliminate the gap between the positive electrode collector tabs 53a. It should be noted that FIGS. 5A and 5B show the state before sandwiching by the pair of foil collecting jigs 200, and FIGS. 6A and 6B show the state after sandwiching by the foil collecting jigs 200. FIGS. 5A and 6A are views as seen from the side surfaces of the wound electrode body 20, respectively, and FIGS. 5B and 6B are cross sectional views along each line AA of these drawings, respectively.

The tip of the foil collecting jig 200 has a comb teeth shape, and the length of the comb teeth is the length corresponding to the position of each group of the positive electrode collector laminated part 56. In the example shown, the divided three groups of the positive electrode collector laminated part 56 are in a stepped shape, and hence the length of the comb teeth of the foil collecting jig 200 changes stepwise according to the stepped arrangement of the groups.

Figure 7A:
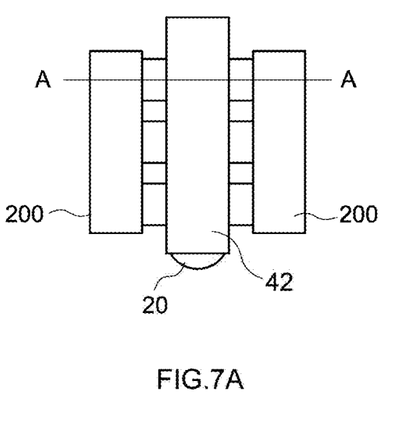
FIG. 7A is an explanatory view of the joining operation (before joining) of the positive electrode collector terminal when the electrode body is seen from the side surface.
Figure 7B:
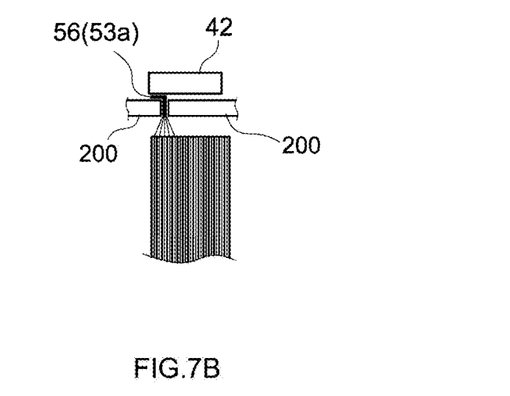
FIG. 7B is a schematic cross sectional view along line AA of FIG. 7A.

Subsequently, as shown in FIGS. 7A and 7B, the positive electrode collector terminal 42 is mounted from above (i.e., the direction orthogonal to the stacking direction of the wound electrode body 20; the winding axis direction) so as to cover all the groups of the positive electrode collector laminated part 56. At this step, the tip part of each group of the positive electrode collector laminated part 56 may be bent so as to facilitate the contact between the tip part of each group of the positive electrode collector laminated part 56 and the positive electrode collector terminal 42. It should be noted that FIG. 7A is a view as seen from the side surface of the wound electrode body 20, and the cross sectional view along line AA of this view is FIG. 7B. Then, all the groups of the positive electrode collector laminated part 56 and the positive electrode collector terminal 42 are joined with each other by ultrasonic joining, laser joining, or the like.

Figure 8:
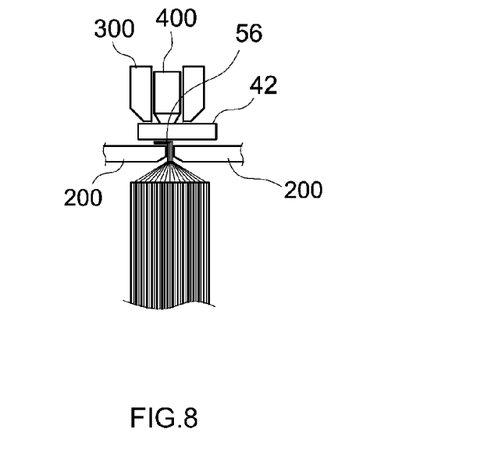
FIG. 8 is a schematic view for illustrating the case where the positive electrode collector terminal is joined by ultrasonic joining.

FIG. 8 shows a schematic view of one example of the case performing ultrasonic joining. In the case performing ultrasonic joining, as shown in FIG. 8, while fixing the positive electrode collector terminal 42 and the positive electrode collector laminated part 56 by a foil holding jig 300 and the foil collecting jig 200, a welding chip 400 of an ultrasonic joining device (not shown) is brought into contact with the positive electrode collector terminal 42 for performing joining. At this step, the foil collecting jig 200 is allowed to function as an anvil. The conditions for ultrasonic joining may be the same as the known conditions.

Figure 9:
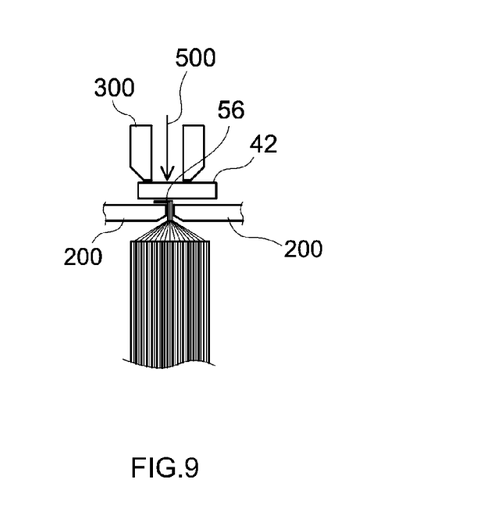
FIG. 9 is a schematic view for illustrating the case where the positive electrode collector terminal is joined by laser joining.

FIG. 9 shows a schematic view of one example of the case performing laser joining. In the case performing laser joining, for example, as shown in FIG. 9, while fixing the positive electrode collector terminal 42 and the positive electrode collector laminated part 56 by the foil holding jig 300 and the foil collecting jig 200, a laser light 500 is emitted thereto from a laser welding device (not shown), thereby performing joining. The conditions for laser joining may be the same as the known conditions.

The negative electrode collector laminated part 66 is also subjected to the same operations, so that all the groups of the negative electrode collector laminated part 66 and the negative electrode collector terminal 82 are joined with each other.

Then, a step of accommodating the wound electrode body 20 in the battery case 30 is performed. The step can be performed according to the known method. Specifically, a lid body of the battery case 30 having an injection port, and the main body of the battery case 30 are prepared. The main body of the battery case 30 has an opening, and the lid body has dimensions covering the opening (see FIG. 1).

The positive electrode terminal 40 and the positive electrode collector terminal 42 are attached to the lid body of the battery case 30 so that these are electrically connected thereto. Further, the negative electrode terminal 80 and the negative electrode collector terminal 82 are attached to the lid body of the battery case 30 so that these are electrically connected thereto. The positive electrode collector terminal 42 and the negative electrode collector terminal 82 are joined with the wound electrode body 20, and accordingly, the wound electrode body 20 is attached to the lid body of the battery case 30. The wound electrode body 20 is inserted into the main body of the battery case 30, and the lid body and the main body of the battery case 30 are sealed.

Then, a nonaqueous electrolyte injecting step is performed. The step can be performed in the following manner: according to the known method, a nonaqueous electrolyte is injected from the injection port of the lid body of the battery case, and the injection port is sealed. In this manner, a lithium ion secondary battery 100 can be obtained.

The lithium ion secondary battery 100 can attain a high space efficiency in the battery case 30. Namely, the proportion of the positive electrode active material layer 54 and the negative electrode active material layer 64 occupying the inside of the battery case 30 can be increased. Further, the electrode collector part serving as a collector part becomes less likely to be broken.

The lithium ion secondary battery 100 can be used for various uses. As desirable uses, mention may be made of a driving power supply to be mounted on a vehicle such as an electric vehicle (EV), a hybrid vehicle (HV), or a plug-in hybrid vehicle (PHV). Further, the lithium ion secondary battery 100 can be used as a storage battery for a compact electric power storage device. The lithium ion secondary battery 100 can be used typically in a form of a battery pack including a plurality of the batteries connected in series and/or in parallel with each other.

Up to this point, as an example, an angular lithium ion secondary battery including a flat-shaped wound electrode body was described. However, the configuration of the electrode body is not limited thereto. For example, the electrode body may be a stacked type electrode body (i.e., an electrode body in which a plurality of positive electrodes and a plurality of negative electrodes are stacked one on another with separators interposed therebetween). It should be noted that the electrode body of a wound electrode body is less susceptible to stacking misalignment, and is advantageous in ease of manufacturing, and maintaining the joint structure of the electrode body and the electrode collector terminal. Further, in the foregoing example, the wound electrode body includes one wound body, but may include two or more wound bodies. However, it is advantageous that the wound electrode body includes one wound body.

Alternatively, the lithium ion secondary battery can be constructed as a cylindrical lithium ion secondary battery, a coin type lithium ion secondary battery, a laminate-cased type lithium ion secondary battery, or the like. Further, the technology herein disclosed is also applicable to other batteries than the lithium ion secondary battery.

Up to this point, specific examples of the present disclosure were described in detail. However, these are merely examples, and should not be construed as limiting the scope of the appended claims. The technology described in the appended claims includes various modifications and changes of the specific examples exemplified up to this point.

What is claimed is:

1. A battery, comprising:
  a single wound electrode body including
    a sheet-shaped positive electrode having a positive electrode active material layer formed on a positive electrode collector, and
    a sheet-shaped negative electrode having a negative electrode active material layer formed on a negative electrode collector, wherein the sheet-shaped positive electrode and the sheet-shaped negative electrode are stacked one on another in a stacking direction with a separator interposed therebetween; and
  a battery case for accommodating the single wound electrode body,
  wherein a number of stacked layers of the single wound electrode body is 90 or more, wherein at one end of the single wound electrode body in a direction orthogonal to the stacking direction, a positive electrode collector laminated part is present, the positive electrode collector laminated part comprises a plurality of positive electrode collector exposed parts each of which does not have the positive electrode active material layer formed thereon, the plurality of positive electrode collector exposed parts is divided into a plurality of first groups while the plurality of first groups being shifted in position in the stacking direction so as not to overlap on a same line in the stacking direction, and the positive electrode collector exposed parts in each of the plurality of first groups are stacked in a state of protruding from the negative electrode, wherein at another end of the single wound electrode body in the direction orthogonal to the stacking direction, a negative electrode collector laminated part is present, the negative electrode collector laminated part comprises a plurality of negative electrode collector exposed parts each of which does not have the negative electrode active material layer formed thereon, the plurality of negative electrode collector exposed parts is divided into a plurality of second groups while the plurality of second groups being shifted in position in the stacking direction so as not to overlap on a same line in the stacking direction, and the negative electrode collector exposed parts in each of the plurality of second groups are stacked in a state of protruding from the positive electrode, wherein the plurality of first groups are mutually independently integrated in one unit, all tip parts of the plurality of positive electrode collector exposed parts in the plurality of first groups are bent and joined to one surface of one collector terminal by ultrasonic welding or laser welding, and the one surface of the one collector terminal faces the single wound electrode body, and wherein the plurality of second groups are mutually independently integrated in one unit, all tip parts of the plurality of negative electrode collector exposed parts in the plurality of second groups are bent and joined to one surface of another collector terminal by ultrasonic welding or laser welding, and the one surface of the another collector terminal faces the single wound electrode body.

2. The battery according to claim 1, wherein a number of the positive electrode collector exposed parts in a first group of the plurality of first groups is 15 or more and 30 or less, and a number of the negative electrode collector exposed parts in a second group of the plurality of second groups is 15 or more and 30 or less.

3. The battery according to claim 1, wherein the plurality of first groups are shifted in position so as to not overlap on the same line in the stacking direction, and shifted in position so as to not overlap on a same line in another direction orthogonal to both (i) the stacking direction and (ii) the direction orthogonal to the stacking direction.

4. The battery according to claim 3, wherein the plurality of second groups are shifted in position so as to not overlap on the same line in the stacking direction, and shifted in position so as to not overlap on a same line in said another direction.

* * * * *